United States Patent [19]

Wallis

[11] Patent Number: 4,558,784

[45] Date of Patent: Dec. 17, 1985

[54] CORRUGATED STRIP TRAY

[76] Inventor: Bernard J. Wallis, 25315 Kean Ave., Dearborn, Mich. 48124

[21] Appl. No.: 633,480

[22] Filed: Jul. 23, 1984

[51] Int. Cl.$^4$ .............................................. B65D 6/00
[52] U.S. Cl. ............................... 206/561; 29/157.3 A; 206/526; 220/22; 294/55
[58] Field of Search ................... 29/157.3 R, 157.3 A, 29/157.3 B, 726; 53/390; 206/321, 526, 561, 565; 220/22; 222/308, 312 B; 294/55, 159, 172; 414/287, 293, 298, 299, 303, 330, 675, 754, 781

[56] References Cited

U.S. PATENT DOCUMENTS

| | | | |
|---|---|---|---|
| 1,757,141 | 5/1930 | Raster | 220/22 |
| 1,766,258 | 6/1930 | Parkerson | 220/22 |
| 2,511,560 | 6/1950 | Bechmann | 294/55 |
| 3,132,735 | 5/1964 | Nilsen | 294/55 |
| 3,917,105 | 11/1975 | Lambert et al. | 220/22 |
| 4,321,739 | 3/1982 | Martin et al. | 29/157.3 |
| 4,461,396 | 7/1984 | Harper | 206/565 |

FOREIGN PATENT DOCUMENTS 0000355 of 1873 United Kingdom ................ 294/55

Primary Examiner—William T. Dixson, Jr.
Assistant Examiner—Jimmy G. Foster
Attorney, Agent, or Firm—Barnes, Kisselle, Raisch, Choate, Whittemore & Hulbert

[57] ABSTRACT

A sheet metal tray for retaining corrugated fin strips for heat exchangers has a plurality of upright partitions spaced laterally apart to accommodate the corrugated strips. The tray has an open end wherein the bottom wall of the tray projects beyond the adjacent ends of the partitions and is formed with a plurality of inwardly extending notches adapted to interengage with spaced heat exchanger coolant tubes supported on an assembly fixture.

1 Claim, 7 Drawing Figures

CORRUGATED STRIP TRAY

This invention relates to trays which hold metal corrugated fin strips.

Corrugated fin strip trays may be used in the assembly of heat exchanger cores. A heat exchanger core normally has a plurality of regularly spaced coolant tubes connected to headers at their opposite ends and has a plurality of thin, transversely corrugated fin strips extending lengthwise between the coolant tubes. In assembling such cores the coolant tubes are frequently arranged in spaced parallel rows on a retaining fixture and the corrugated fin strips are inserted therebetween either one at a time or in groups so that the entire assembly can be soldered together. The corrugated fin strips are sometimes arranged in trays which, when tilted, discharge the strips into interdigital relation with the fixture-supported coolant tubes. An interest in the extended life of these trays must be balanced against the need for them to be light weight; trays must be relatively light so that they may be moved and unloaded manually when necessary. Plastic trays, while light, have been found to wear too quickly as the metal strips grind against the trays during both the loading and the unloading process.

The object of this invention is to provide a light weight, durable corrugated fin strip tray which has a means for rapidly aligning the strips between the heat exchanger tubes during the unloading process.

Other objects, features and advantages of the present invention will become apparent from the following description and accompanying drawings, in which.

Figure 1:
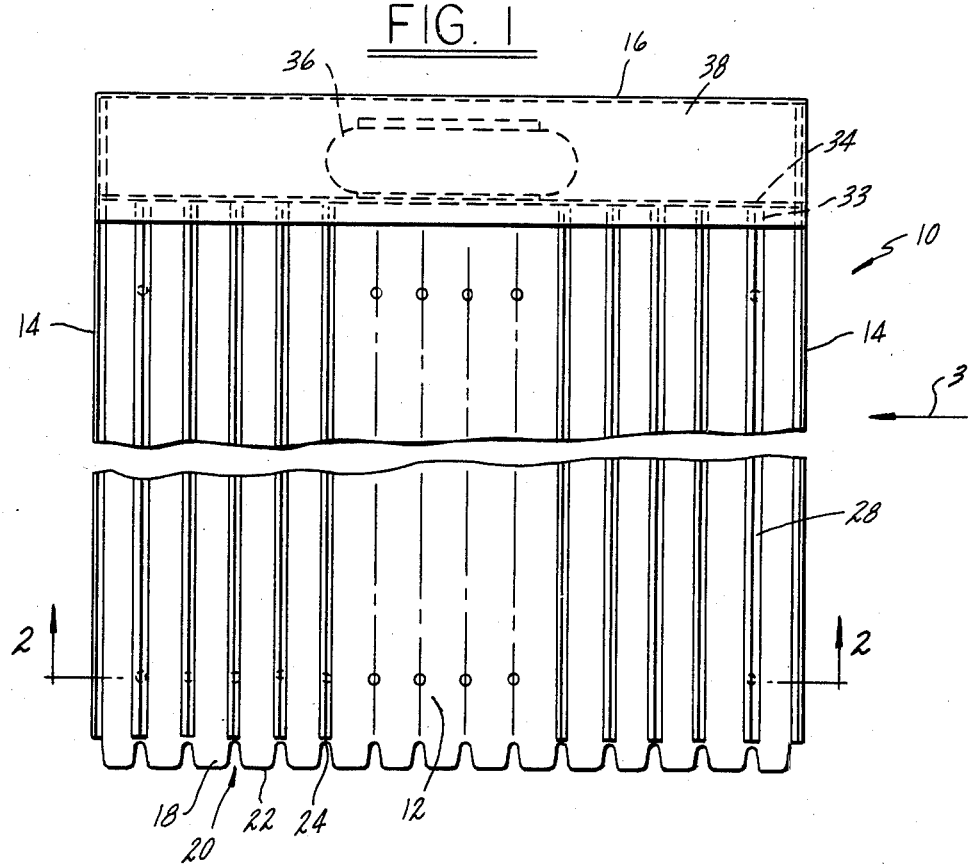
FIG. 1 is a top plan view of a tray of the present invention.

FIG. 1 shows the empty corrugated fin strip tray 10 comprising a rectangular sheet, aluminum base 12 bent upwardly nearly perpendicular along three of its edges to form a pair of side walls 14 and an end wall 16. At the end opposite the end wall 16, the base 12 terminates in a series of fingers 18 separated by uniformly-spaced tapered notches 20. The side edges of each notch 20 taper inwardly toward each other from the open end 22 of the fingers 18 and terminate in rounded ends 24.

Figure 2:
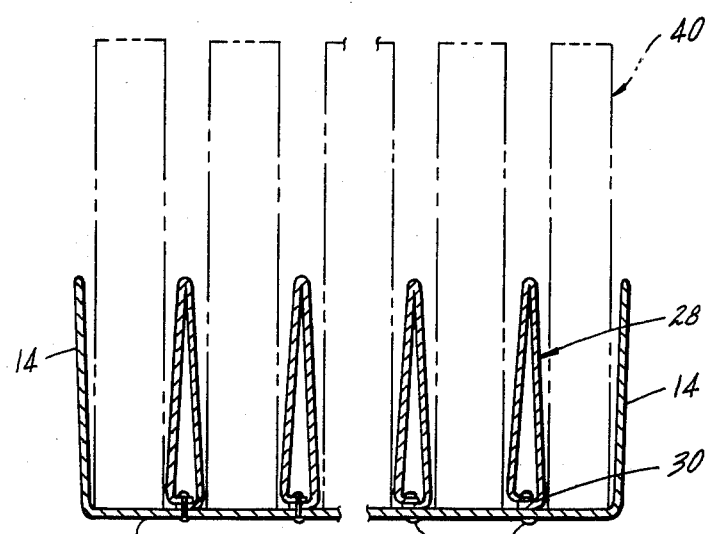
FIG. 2 is a sectional view along the line 2—2 in FIG. 1.
Figure 3:
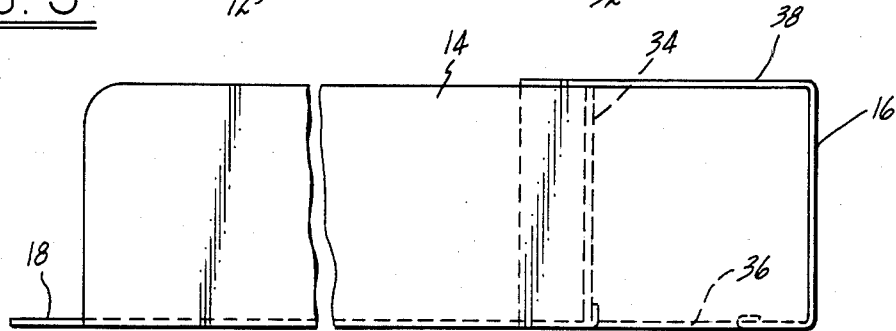
FIG. 3 is a side view of the tray shown in FIG. 1.

As shown in FIGS. 1 and 2, the tray is also provided with a series of upstanding, longitudinally extending, parallel partitions 28 which are uniformly spaced apart between side walls 14. At the open end of the tray the partitions are aligned with the ends 24 of notches 20. Each partition 28 comprises an aluminum strip bent lengthwise into an approximate isosceles triangle configuration, with the bent free ends overlapping at the base 30 of the triangle so that pop rivets 32 may be driven therethrough to secure the partitions 28 to base 12. The ends 33 of the partitions 28 opposite the open end of the tray abut a sheet aluminum back-up wall 34 which extends transversely between side walls 14 and is spaced forwardly of the end wall 16 of the tray. In the space between the end wall 16 and back-up wall 34 a hand hold 36 is punched out of the aluminum base 12. A cover strip 38 extends forwardly from the upper edge of rear wall 16 over the space between the end wall 16 and back-up wall 34. Cover strip 38 overlaps slightly the upper rear ends of partitions 28 (FIG. 3).

Figure 4:
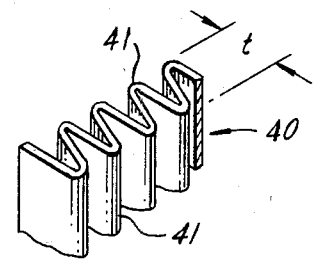
FIG. 4 is a fragmentary perspective view of a corrugated strip with which the tray is designed to be loaded.

The corrugated fin strip 40 for which the tray 10 is designed is shown in FIG. 4. It comprises a thin metal strip bent transversely along regularly spaced parallel lines 41 into zig-zag shape. Such strips are normally formed with series of finned openings therein to maximize the heat transfer effect of the air flow through the heat exchanger.

Figure 5:
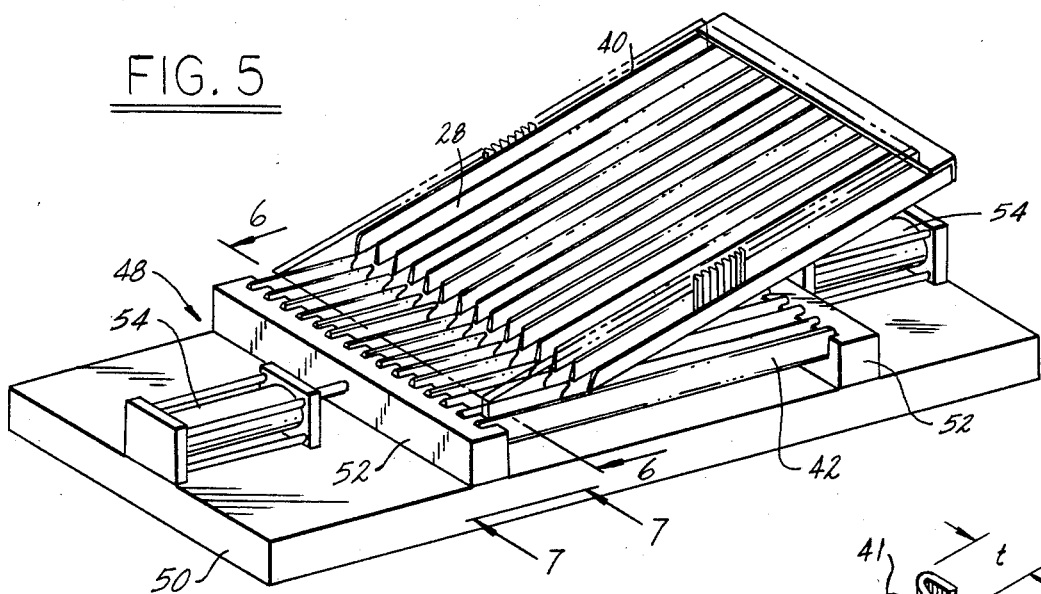
FIG. 5 is a perspective view illustrating the manner in which a loaded tray is unloaded.
Figure 6:
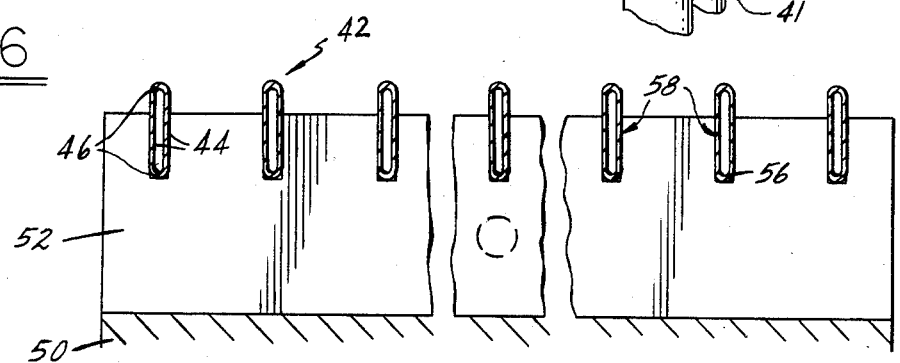
FIG. 6 is a sectional view along line 6—6 in FIG. 5.

The coolant tubes 42 of a heat exchanger core are illustrated best in FIG. 6. Each tube has a pair of flat side walls 44 connected along their opposite edges by rounded portions 46. Prior to assembly of the corrugated fin strips 40 with the tubes 42, the tubes are arranged in regularly spaced, parallel relation on a fixture 48 (FIG. 5). Fixture 48 comprises a base plate 50 having a pair of transversely extending, opposed support bars 52 thereon. One or both support bars 52 are adapted to be displaced toward and away from the other by means of a pneumatic cylinder 54 and the distance of separation therebetween corresponds to the length of the corrugated fin strips 40. Each support bar is formed with regularly spaced, vertically extending pockets 56 for reception of the opposite ends of tubes 42. The spacing 58 between the successive pockets 56 and their respective tubes 42 on fixture 48 corresponds generally to the thickness t of the corrugated fin strip. Accordingly, on the tray 10, the spacing between the lower edges of partitions 28 likewise generally corresponds to the thickness t of the corrugated fin strip. The base 30 of each partition has a width which corresponds generally to the lateral dimension of the tube 42. The rounded ends 24 of notches 20 are spaced apart to correspond with the spacing between tubes 42 on fixture 48 so that they can interfit with the upper rounded edges of the tubes.

A machine (not shown) which cuts the corrugated fin strips 40 to uniform length slides such strips 40 longitudinally into each channel formed by the partitions 28 as a series of trays are indexed laterally across the machine outlet.

Figure 7:
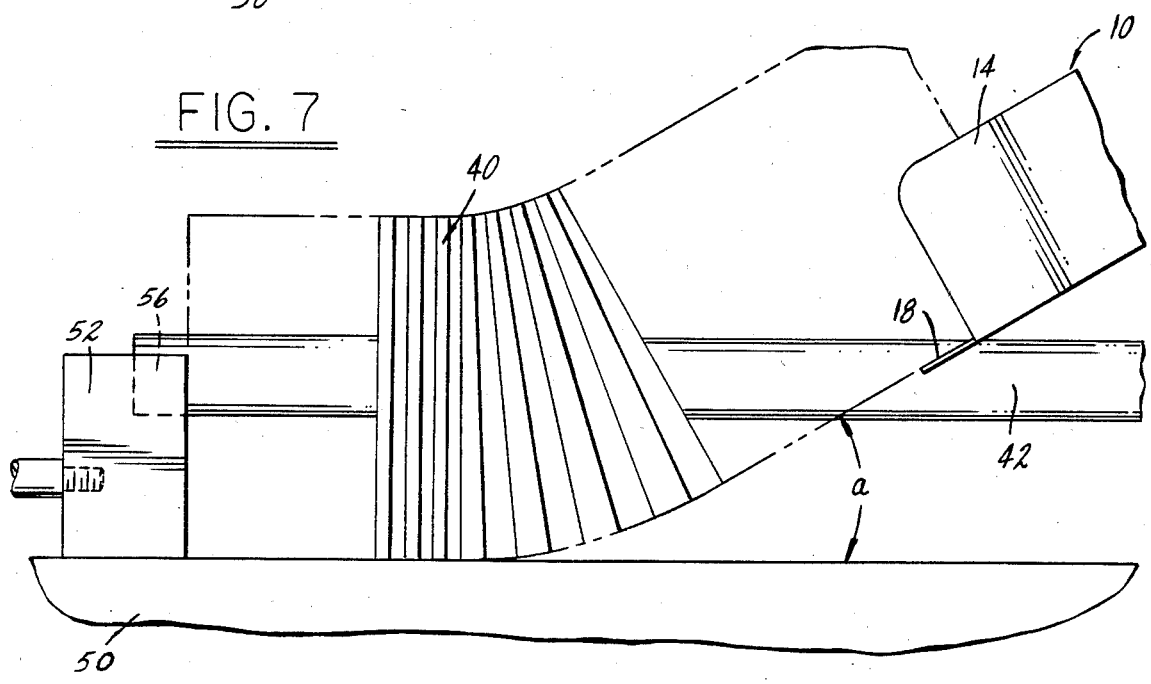
FIG. 7 is a fragmentary side view along line 7—7 in FIG. 5.

The loaded trays are then mechanically or manually transported to the fixture 48 filled with laterally spaced heat exchanger tubes 42 (FIG. 4). The loaded tray is then unloaded by inserting the fingers 18 into the space 58 between adjacent tubes 42 near one of the support bars 52, with the open end of the tray 10 closest to said support bar 52, while tilting the tray 10 forward to some predetermined angle a until the corrugated fin strips 40 slide part way out of the tray 10, between said tubes 42, and abut the support bar 52 (FIG. 7). Maintaining said angle a, the tray 10 is drawn back so that the corrugated fin strips 40 slide entirely out of the tray.

I claim:

1. A tray for use in a machine for assembling heat exchanger cores wherein a plurality of corrugated metal fin strips are placed in interdigital relation with a plurality of coolant tubes which are retained in uniformly laterally spaced parallel relation, said tray comprising a base plate having a length to accommodate the strips in lengthwise fashion and a width to accommodate a plurality of the strips in a laterally spaced relation, a plurality of laterally spaced partitions extending lengthwise of said base and forming a plurality of successive channels in which the strips are adapted to be arranged lengthwise, means adjacent one end of the base plate forming an end wall against which one end of the strips are adapted to abut, and means at the opposite end of the base plate forming a plurality of laterally spaced fingers adapted to engage between the laterally successive coolant tubes so as to align said channels with the spaces between the successive tubes so that, when the tray is inclined to a predetermined extent and displaced axially along said tubes, the strips are deposited in an interdigital relation with the tubes, each partition having opposite side walls which extend longitudinally of the base and which slope away from each other in a downward direction so that the channels are narrower at the base than at the top thereof, each partition comprising a metal strip bent lengthwise along three parallel lines into triangular shape, the opposite free edge portions of the bent strip forming the base of the partition and being disposed in overlapping relation with rivets extending through said overlapping portions and the base of the tray to secure the partition to said base.

* * * * *